United States Patent [19]

Waterman

[11] 4,446,616
[45] May 8, 1984

[54] POWER ASSIST, MANUAL, BAND LABELER

[76] Inventor: Theodore Waterman, Christmas Tree La., Milford, N.H. 03055

[21] Appl. No.: 331,607

[22] Filed: Dec. 17, 1981

[51] Int. Cl.³ .......................... B23P 21/00; B65B 7/28; B65B 67/00; B65B 9/10
[52] U.S. Cl. ........................................ 29/775; 53/291; 53/294; 53/390; 53/567; 53/585
[58] Field of Search .................... 29/775; 53/291, 292, 53/293, 294, 295, 390, 567, 587

[56] References Cited

U.S. PATENT DOCUMENTS 4,102,728  7/1978  Smith ..................................... 53/291
4,127,978  12/1978  Lucke ................................... 53/585
4,243,466  1/1981  Lindee ................................... 53/291

Primary Examiner—Howard N. Goldberg
Assistant Examiner—Steven Nichols

Attorney, Agent, or Firm—Pearson & Pearson

[57] ABSTRACT

A semi-automatic, poly-sleeve labeler has a banding station to which containers are conveyed, there being a roll supply of flat, tubular, poly-sleeve labels above the station. A fixed, upstanding, flat, holder and an inclined, spring-biased, pivoted, flat, holder are mounted at a predetermined distance above the level of the conveyor path to support an open band. The operator tears off a band, places it over the holders, presses a pedal which causes a piston head to lift the container at the station, up through the holders for frictional engagement within the band. The banded container is removed and the parts return for the next cycle. A gear rack and pinion mechanism advances the bands individually and successively over a spreader to a tear-off location at about eye level. The spreader includes oppositely disposed concave recesses in each of which one of the oppositely disposed feed rolls is seated.

10 Claims, 10 Drawing Figures

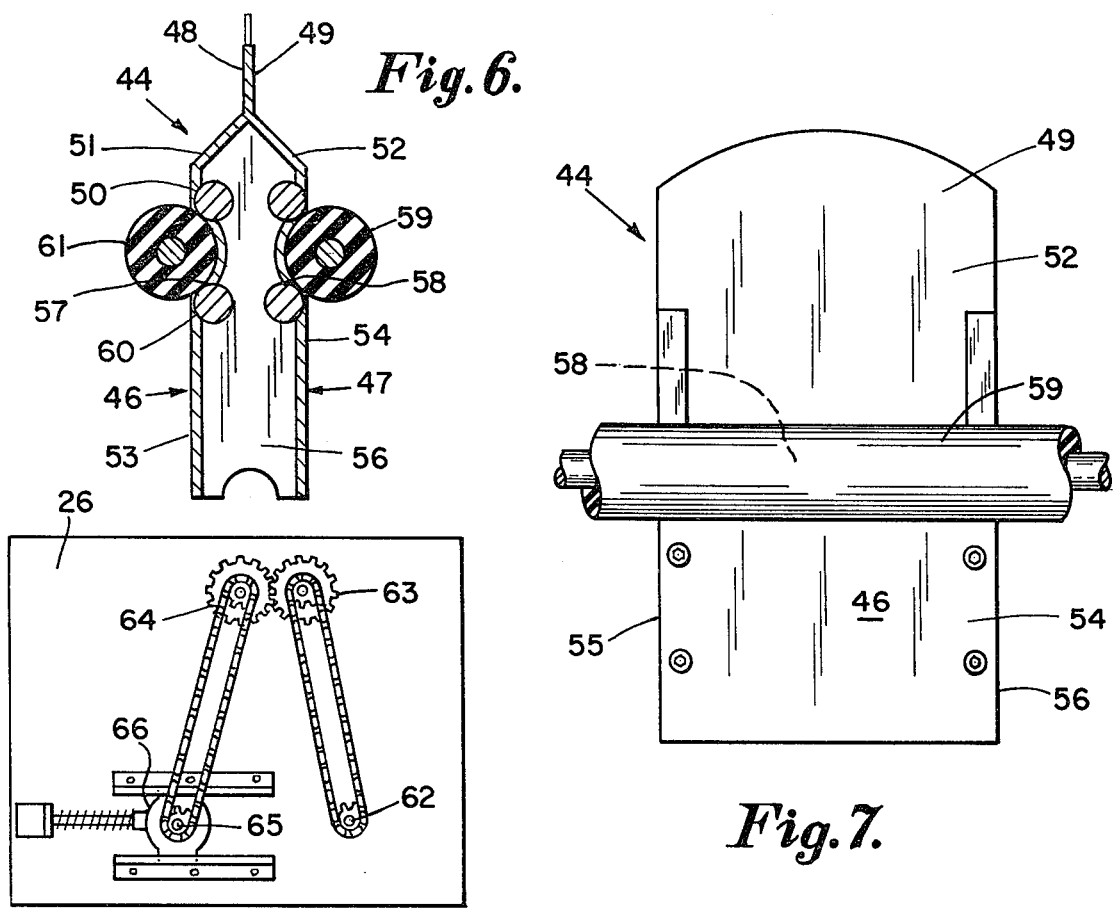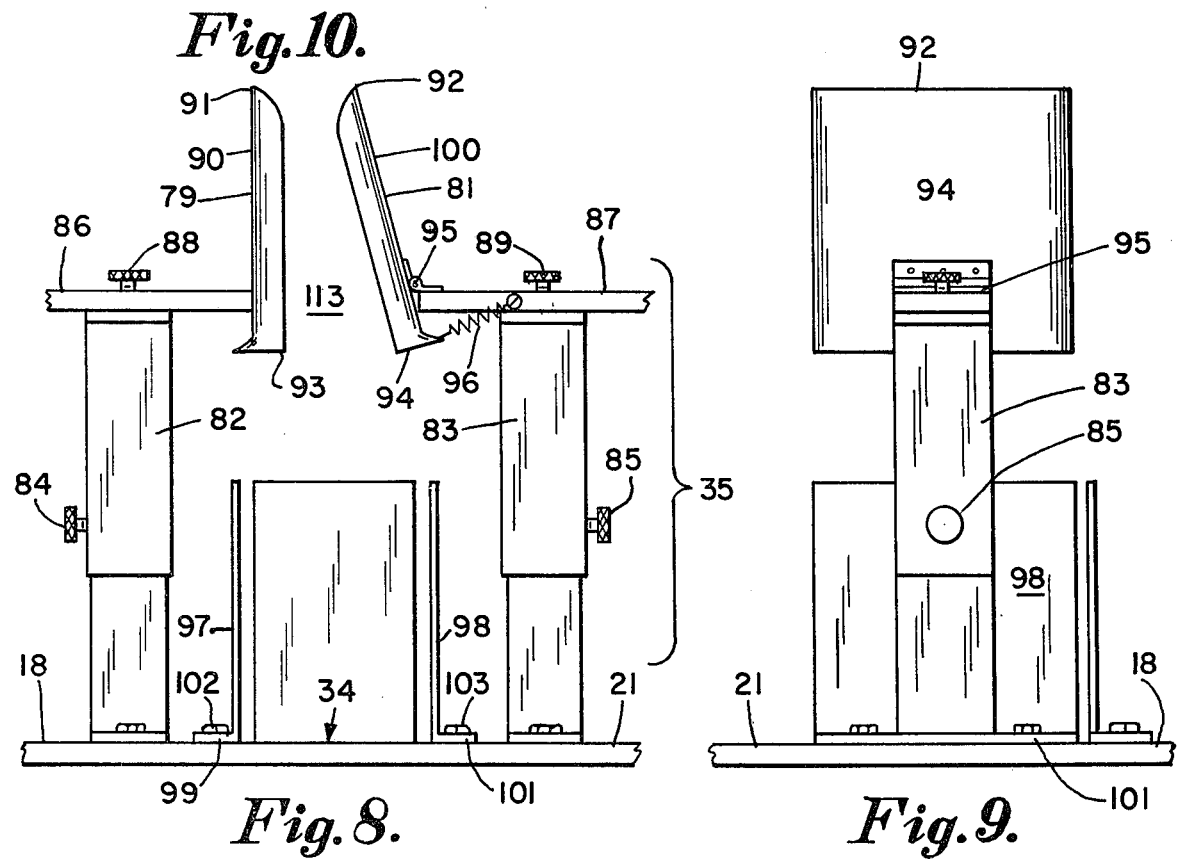

4,446,616

POWER ASSIST, MANUAL, BAND LABELER

BACKGROUND OF THE INVENTION

Automatic, semi-automatic and manual label applying apparatus is well known for applying a tubular, sleeve or band label, usually of flexible, resilient plastic, around the outside of a container usually also of flexible resilient plastic.

In U.S. Pat. No. 3,738,210 to Fujio of June 12, 1973, the containers remain stationary and a suction arm pulls a tube around a spreader and down around the container.

In U.S. Pat. No. 4,102,728 to Smith of July 25, 1978, the containers also remain stationary while a pair of grippers pull the tube down around a spreader and down around the container.

On the other hand, in U.S. Pat. No. 3,850,777 of Nov. 26, 1974 to Mare and U.S. Pat. No. 4,243,466 of Jan. 6, 1981 to Lindee each tubular label is placed over a set of arcuate holders or between a set of grippers and the container is lifted upwardly thereinto for application.

SUMMARY OF THE INVENTION

In this invention the containers are advanced individually and successively along a horizontal path to a banding, or labelling, station at about waist level of an operator. A power operated rack and pinion mechanism feeds a plurality of flat tubular labels in strip form from a roll, individually and successively around a spreader, which is supported within the tube by sets of rollers, to a tear off location at about eye level. A pair of band, or tubular label, holders are adjustably mounted at about chest level above the path of the containers, each holder being generally flat and planar. One holder is fixed and the other is spring pivoted and inclined toward the fixed holder so that the operator can tear off the end most label and sleeve it over the holders. The operator then presses the actuating pedal to cause a fluid operated piston head to raise the container, halted at the banding station, up through the holders, to frictionally engage the inside of the upper portion of the label while the operator strokes the label into fully applied position on the container. The labelled container is then bodily removed from the piston head, which is then automatically retracted downward at the same time that the feed mechanism feeds another open label, or band, to the "tear-off" location.

BRIEF DESCRIPTION OF THE DRAWINGS

FIG. 6 is an enlarged, side elevation; and

FIG. 7 is an enlarged front elevation of the spreader of the invention;

FIG. 8 is an enlarged side elevation;

FIG. 9 is an enlarged front elevation of the first plate band holders of the invention; and FIG. 10 is a fragmentary side elevation of the nip roll drive.

DESCRIPTION OF A PREFERRED EMBODIMENT

Figure 1:
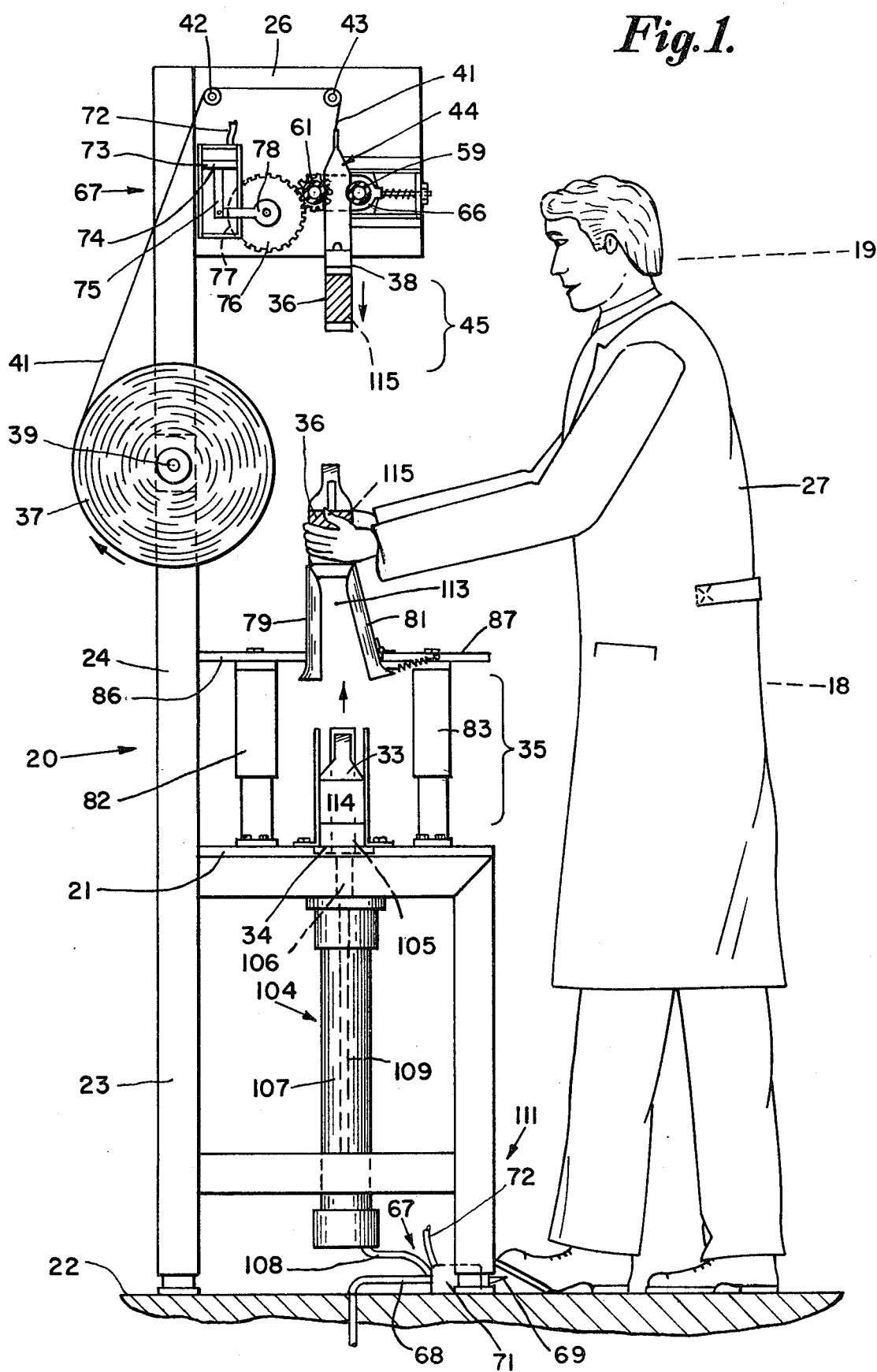
FIG. 1, is a side elevation of the power assist, manual, band labeler of the invention.

As shown in the drawings, the power assist, manual, band labeler 20 of the invention includes a waist level platform 21 supported from ground level 22 by legs such as 23 and a pair of back post members 24 and 25 supporting a superstructure 26. An operator 27 is shown to clarify the meaning of waist level 18 and eye level 19 as used herein.

Conveyer means 28, which could be of the gravity type but preferably is a powered endless member 29, trained around sheaves, or gears 31, has an upper reach 32, for advancing a plurality of identical containers 33, individually and successively along a horizontal path 34 at the waist level 18 of platform 21. The conveyor means 28 is power driven by an electric motor, or other suitable means, not shown, and may be of any commercially available type for advancing containers up to the banding station 35 of labeler 20.

The illustrated containers 33 typify the round, square, rectangular or other shape, of plastic container labeled in labeler 20, the tubular sleeve, or band, labels 36 being usually of polyethylene, which is flexible and slightly resilient and stretchable. The plastic polysleeve labels 36 are supplied in flat, tubular, continuous form, as a roll 37, with preperforated transverse lines 38 which permit them to be separated into individual labels successively. Roll 37 is mounted on a shaft 39, the flat tubular strip 41, unwound therefrom, being trained over suitable idler rolls, or guides, 42 and 43, thence downwardly around the spreader 44 to the "tear off" station 45, directly above the banding station 35, but at about eye level 19.

As best shown in FIGS. 6 and 7 the spreader 44 includes a pair of plates 46 and 47 having their top edges 48 and 49 affixed to each other by welding, or otherwise, thence each extending outwardly and downwardly in tapered walls at 51 and 52 and thence extending downwardly, in parallelism at a spaced distance apart in side walls 53 and 54 to cause the flat tube to open up. Spreader 44 has end walls 55 and 56, and a pair of oppositely disposed concave recesses 57 and 58 in side walls 53 and 54, in each of which, one of a pair of driven nip rolls 59 or 61 is seated. The nip rolls support the spreader in floating position within the tubular strip 41, with the assistance of pairs of upper and lower rolls such as at 50 or 60. Each of the rolls of the pairs of upper and lower rolls such as 50 or 60 is journalled at each end in one of the opposite end walls 55 or 56. Nip roll 59 is mounted on shaft 62, which is chain driven from gear 63 meshed with gear 64, in turn chain driving shaft 65 of nip roll 61, the shaft 65 being spring loaded by sliding bearing block 66.

Powered band supply means 67 preferably includes a source of air under pressure 68, such as mill air, which is controlled by the foot pedal 69, valve 71, and air conduits 72 to an air cylinder 73 having a sliding piston head 74, with spring, or air, retraction. Piston head 74 reciprocates piston 75, the reciprocatory motion being transferred to rotary, one way, motion of a gear 76 by suitable rack and pinion, or ratchet and pawl, mechanism 77 and a one way clutch 78. Gear 76 drives shaft 65 of nip roll 61, so that when the operator presses the pedal 69, one label 36 is advanced to the tear off station 45.

A fixed holder 79 and an oppositely disposed pivotable, spring biased holder 81 are mounted at banding station 35, intermediate of waist level 18 and eye level 19. Each holder 79 or 81 is mounted on a vertically telescopable post such as 82 or 83, having a set screw 84 or 85, and each is mounted on its post by a horizontally adjustable bracket 86 or 87, having a set screw 88 or 89. Thus the holders may be spaced apart at any selected distance to conform with the cross sectional shape of the containers of a particular run.

As best shown in FIGS. 8 and 9, holder 79 is normally vertical while holder 81 is normally tilted inwardly at an incline so that the upper edges 91 and 92 are more closely spaced than the lower edges 93 and 94, and each plate is substantially flat and planar at 99 and 100, so that the upper edges 91 and 92 are in substantial parallelism and a truncated, wedge is outlined in plan. The pivot of holder 81 is designated 95 and the coil spring is designated 96.

Preferably a pair of guides 97 and 98 each having a right angular flange 99 or 101 are affixed by set screws 102 or 103 on each side of the horizontal path 34 of the incoming containers 33 to maintain alignment in advance of the banding station 35.

Power actuated container lift means 104 is provided at banding station 35, including a piston head 105 normally below the path 34, but arranged to slidably receive each successive individual container 33 to lift it from the waist level 18 of the station up through the holders 79 and 81. Piston head, or platform 105, is mounted on a piston 106 reciprocable up and down in a cylinder 107, by air pressure through conduit 108 from pedal valve 71.

A barrier rod, 109 depends from head 105 in the path of the next successive container 33 to prevent interference with the rise of the preceding container and retraction of the head after the labeled container has been removed by the operator at the top of the stroke of the piston.

Figure 5:
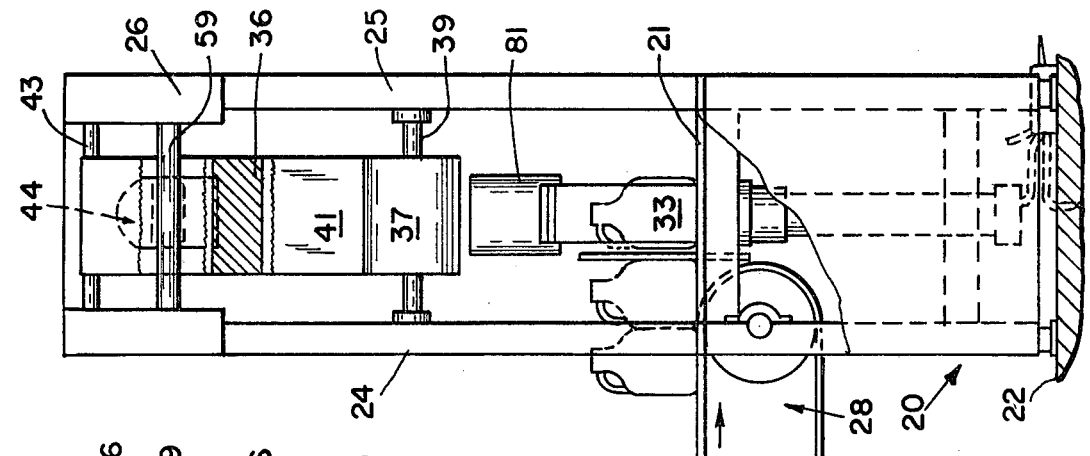
FIGS. 2, 3, 4, and 5 are front elevations, on a reduced scale, showing the cycle of operations of the apparatus.
Figure 4:
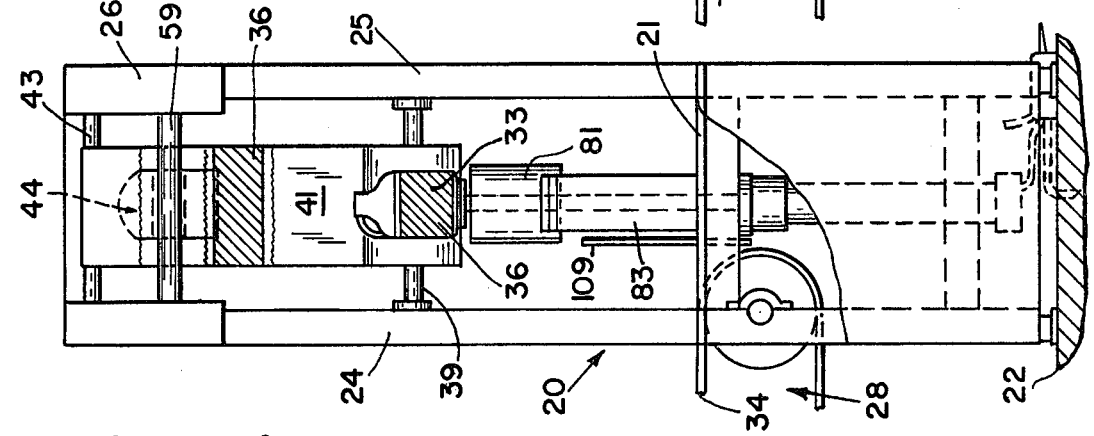
Figure 3:
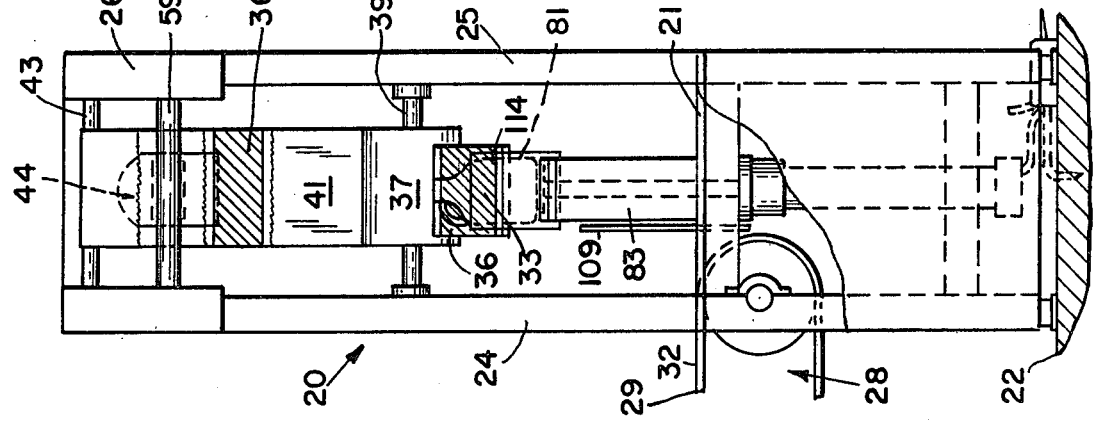
Figure 2:
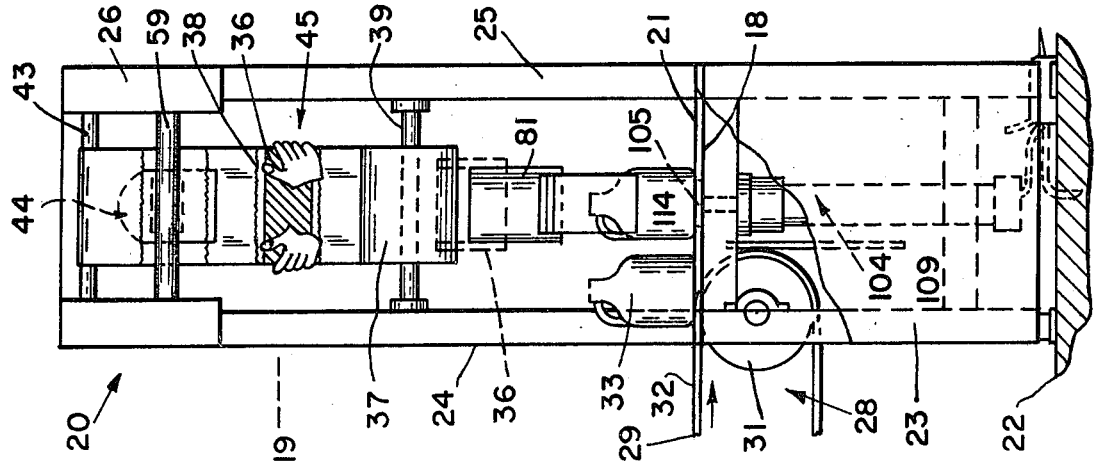

In operation, the control means 111 of the invention, set in motion by the pedal 69 and fluid valve 71 by the operator 112, causes one open tubular label band 36 to be presented to the tear off station 45. The operator 112 then manually tears off the label 36, on its perforated line 38, (FIG. 2) and sleeves it over the holders 79 and 81. The operator 27 then presses pedal 69 again which causes the piston head 105 to raise the container 33 then halted at banding station 35, up through the gap 113 between the holders 79 and 81 so that frictional contact of the exterior surface 114 of the container 33 with the inside surface 115 of the label plus the stroking guidance of the hands of the operator assure that the label is properly oriented on the container, (FIGS. 3 and 4). The labeled container is then bodily manually removed by the operator, (FIG. 1) and the piston head 105 retracts and another label is presented at the tear off station, (FIG. 5).

I claim:

1. A power assist, manual, band labeler enabling an operator to apply plastic labels to containers comprising:
    powered conveyor means for advancing a plurality of identical containers along a horizontal path, including a banding station at about waist level;
    powered band supply means for feeding a plurality of bands of flexible, resilient plastic, in flat tubular, preperforated, form individually and successively around band spreader means mounted above said station to a tear off location at about eye level;
    said band spreader means being located within the flat tubular form of said bands and having opposite side walls, oppositely disposed concave recesses in each said side wall and a feed roll, seated in each said recess, for feeding said bands;
    a fixed holder and an oppositely disposed, pivotable, holder normally inclined toward said fixed holder, said holders mounted at said station, intermediate of waist and eye levels, and adapted to support a band in open tubular form, placed thereover by said operator;
    said pivotable holder being spring biased to resiliently pivot outwardly for the passage of a container between said holders;
    power actuated container lift means at said station for lifting each successive container, halted at said station, upwardly between and through said holders to frictionally transfer a band therefrom onto the exterior of said container;
    and control means for retracting said container lift means to waist level to receive the next successive container while actuating said band supply means to feed the next successive band along said spreader into tear off position.

2. A power assist, manual, band labeler, as specified in claim 1, wherein:
    said fixed holder is normally vertical and each said holder includes a flat planar surface parallel to the flat planar surface of the other said holder;
    whereby each open tubular band encompassing said holders defines a substantial rectangle in plan to assure that the material of the band is frictionally engaged by the surface of the container regardless of the cross-section shape of the container.

3. A power assist, manual band labeler, as specified in claim 1, wherein:
    said fixed holder is normally vertical and each said holder is generally flat and planar, and said holders have upper edges and lower edges, the upper edges being normally more closely spaced than the lower edges to form an upwardly and inwardly tapered band support.

4. A power assist, manual, band labeler as specified in claim 1 wherein:
    said power actuated container lift means includes a piston head normally at waist height on said horizontal path at said banding station for receiving each individual and successive container;
    fluid cylinder and piston means for lifting said head to about chest level and retracting the same to waist level and a rod depending from said head in the path of the next successive container on said conveyor means for holding the same back on said path.

5. A power assist, manual, band labeler as specified in claim 1 wherein:
    each said holder is mounted on one of a pair of telescopable posts, each height adjustable by a set screw; and
    each said holder is mounted on its said post by a horizontally adjustable bracket;
    whereby the height and spacing of said holders is readily adjustable to fit different sizes of containers.

6. A power assist, manual band labeler, as specified in claim 1 wherein:
    said powered band supply means includes an air cylinder and piston driving a rack operably connected to a pinion gear by an adjustable connection;
    and said labeler includes a source of air under pressure connected to said cylinder and controlled by a foot pedal actuated valve;
    one said label being advanced to said tear off location when said foot pedal valve is actuated.

7. A power assist, manual, band labeler as specified in claim 1 wherein:

said labeler includes a pair of oppositely disposed upstanding guides, each extending along an opposite side of the horizontal path of said containers in advance of said banding station, each guide having a base flange attached to said labeler by set screws; whereby the spacing of said guides is readily adjustable.

8. A power assist, manual, band labeler for applying open tubular labels onto the exterior of containers at a banding station characterized by:
   a pair of oppositely disposed holders for supporting an open tubular label mounted at said station;
   one said holder being fixed in upstanding position and generally flat and planar with a straight, horizontal top edge; and
   the other said holder being generally flat and planar with a straight horizontal top edge, and mounted to normally incline toward the other said holder, but being spring biased to resiliently pivot outwardly for the passage of a container between said holders;
   the top edges of said holders being in parallelism and said holders defining a truncated wedge in plan.

9. A power assist, manual, band labeler as specified in claim 1 wherein:
   said band spreader means includes a pair of upper rolls and a pair of lower rolls, each journalled in said hollow structure and associated with one of said concave recesses and with the feed roll seated therein, for stabilizing said structure.

10. A power assist, manual, band labeler as specified in claim 9 wherein:
    said spreader includes a pair of top edges affixed to each other and each extending outwardly and downwardly in a tapered wall to one of said side walls.

* * * * *